US012294191B2

(12) United States Patent
Huang et al.

(10) Patent No.: US 12,294,191 B2
(45) Date of Patent: May 6, 2025

(54) CONNECTION MODULE CAPABLE OF INTEGRATING ELECTRONIC CONTROL

(71) Applicants: Wen-Hsin Huang, New Taipei (TW); Chin-Chiang Chen, New Taipei (TW)

(72) Inventors: Wen-Hsin Huang, New Taipei (TW); Chin-Chiang Chen, New Taipei (TW)

(73) Assignee: CviLux Electronics (Dongguan) Co., Ltd., Guang Dong Province (CN)

( * ) Notice: Subject to any disclaimer, the term of this patent is extended or adjusted under 35 U.S.C. 154(b) by 482 days.

(21) Appl. No.: 17/868,849

(22) Filed: Jul. 20, 2022

(65) Prior Publication Data

US 2024/0030667 A1 Jan. 25, 2024

(51) Int. Cl.
*H01R 27/02* (2006.01)
*H01R 13/52* (2006.01)
*H01R 13/639* (2006.01)

(52) U.S. Cl.
CPC ......... *H01R 27/02* (2013.01); *H01R 13/5219* (2013.01); *H01R 13/639* (2013.01)

(58) Field of Classification Search
CPC ... H01R 13/639; H01R 13/5219; H01R 27/02
USPC ....................................... 439/38, 364, 95, 89
See application file for complete search history.

(56) References Cited

U.S. PATENT DOCUMENTS

2014/0148019 A1* 5/2014 Sasaki .................. H01R 12/585 439/78
2014/0371568 A1* 12/2014 Selby ..................... H01R 12/58 29/882
2019/0123479 A1* 4/2019 Lim ................. H01R 13/62983
2020/0094032 A1* 3/2020 Ross ................. A61M 5/16877

* cited by examiner

*Primary Examiner* — Tulsidas C Patel
*Assistant Examiner* — Thaslimur Rahman

(57) ABSTRACT

A connection module capable of integrating electronic control contains: a male connection assembly, a female connection assembly, and a controlling portion. The male connection assembly includes a coupling section, at least one current transmission set, at least one signal transmission set, and at least one engagement portion. The female connection assembly includes a coupling section, at least one current transmission set, at least one signal transmission set, and at least one engagement portion. The controlling portion is connected with the drive mechanism of the male connection assembly to actuate, control and detect the drive mechanism. The male connection assembly is located below the female connection assembly, and the coupling section of the female connection assembly is covered in the coupling section of the male connection assembly. The signal transmission set of the male connection assembly contacts with the signal transmission set of the female connection assembly.

7 Claims, 9 Drawing Sheets

CONNECTION MODULE CAPABLE OF INTEGRATING ELECTRONIC CONTROL

FIELD OF THE INVENTION

The present invention relates to a connector module, and more particularly to a connection module capable of integrating electronic control to electronic components.

BACKGROUND OF THE INVENTION

For current technology, a conventional electrical connector module is applicable for an energy storage system and is roughly divided into two types, one only transmits a large current, and the other transmits a signal merely.

In order to obtain a connection precision, a large number of interface modules of the electrical connector will be used as an efficient construction method. Therefore, the single function of the electrical connector and the mating strength of the male and female ends will cause the complexity of construction, low transmission efficiency and increased manufacturing costs. Furthermore, water resistance is also one of the focuses that have been considered in recent years The present invention has arisen to mitigate and/or obviate the afore-described disadvantages.

SUMMARY OF THE INVENTION

One aspect of the present invention is to provide a connection module which is capable of integrating electronic control, transmitting large electric currents and signals.

Another aspect of the present invention is to provide a connection module which contains a controlling portion to adjust, control and reinforce connection between multiple electric connectors and to obtain waterproof effect.

To obtain the above aspects, connection module provided by the present invention contains: a male connection assembly, a female connection assembly, and a controlling portion.

The male connection assembly includes a coupling section, at least one current transmission set, at least one signal transmission set and at least one engagement portion which are received in the coupling section of the male connection assembly. The at least one engagement portion has a drive mechanism arranged on a predetermined position thereof and configured to actuate the at least one engagement portion.

The female connection assembly includes a coupling section, at least one current transmission set, at least one signal transmission set and at least one engagement portion which are arranged on the coupling section of the female connection assembly.

The controlling portion is accommodated in the male connection assembly and is connected with the drive mechanism of the male connection assembly to actuate, control and detect the drive mechanism.

The male connection assembly is located below the female connection assembly so that the male connection assembly mates with the female connection assembly, the coupling section of the female connection assembly is covered in the coupling section of the male connection assembly so that the current transmission set of the male connection assembly contacts with the current transmission set of the female connection assembly. The signal transmission set of the male connection assembly contacts with the signal transmission set of the female connection assembly. The engagement portion of the female connection assembly is received in and connected with the engagement portion of the male connection assembly.

The coupling section of the male connection assembly and the coupling section of the female connection assembly are formed in any one of a circle shape, an oval shape, and a square shape having four arcuate corners.

The coupling section of the male connection assembly has a fixing portion extending from a bottom thereof, and the fixing portion has multiple locating orifices defined thereon. the coupling section of the female connection assembly has a fixing portion extending from a bottom thereof, the fixing portion has multiple locating orifices defined thereon.

The fixing portion of the male connection assembly and the fixing portion of the female connection assembly are formed in a square shape to mate with a three-dimensional or a horizontal interface of a device.

The fixing portion of the male connection assembly and the fixing portion of the female connection assembly are alternatively formed in a circle shape or an oval shape to mate with a circular interface or an oval interface of a device.

The coupling section of the female connection assembly is inserted into the coupling section of the male connection assembly. The coupling section of the male connection assembly has a body in which an accommodation chamber is defined, and the body has a waterproof ring surrounding the body. A diameter of the coupling section of the female connection assembly is less than a diameter of the accommodation chamber of the body, and the coupling section of the female connection assembly has a waterproof ring surrounding therearound.

The coupling section of the female connection assembly is covered to the coupling section of the male connection assembly. The coupling section has a predetermined height and the waterproof ring of the coupling section, and a diameter of the coupling section of the female connection assembly is more than a diameter of the coupling section.

The engagement portion of the male connection assembly has two symmetrical retaining extensions extending from a top thereof to engage and reinforce the connection module.

The coupling section of the female connection assembly has a protection extension extending therefrom and configured to cover the fixing portion of the female connection assembly. The protection extension has a predetermined length and a predetermined width, and the predetermined length of the protection extension is more than the coupling section of the female connection assembly.

The fixing portion of the female connection assembly has a lid extending from a top thereof.

The current transmission set of the female connection assembly has a circular terminal formed on a first end thereof and configured to contact with the current transmission set, and a second end of the circular terminal is electrically connected with an electric wire.

The current transmission set of the female connection assembly is a terminal of a crown spring connector, and the current transmission set has a recess defined thereon and configured to connect with the current transmission set of the male connection assembly.

The at least one engagement portion of the female connection assembly is a pin, and the pin of the female connection assembly has a clamp portion.

The controlling portion is an electromagnetic valve, and the controlling portion is configured to adjust an engagement force of the two symmetrical retaining extensions of the drive mechanism.

DETAILED DESCRIPTION OF THE PREFERRED EMBODIMENTS

Figure 1:
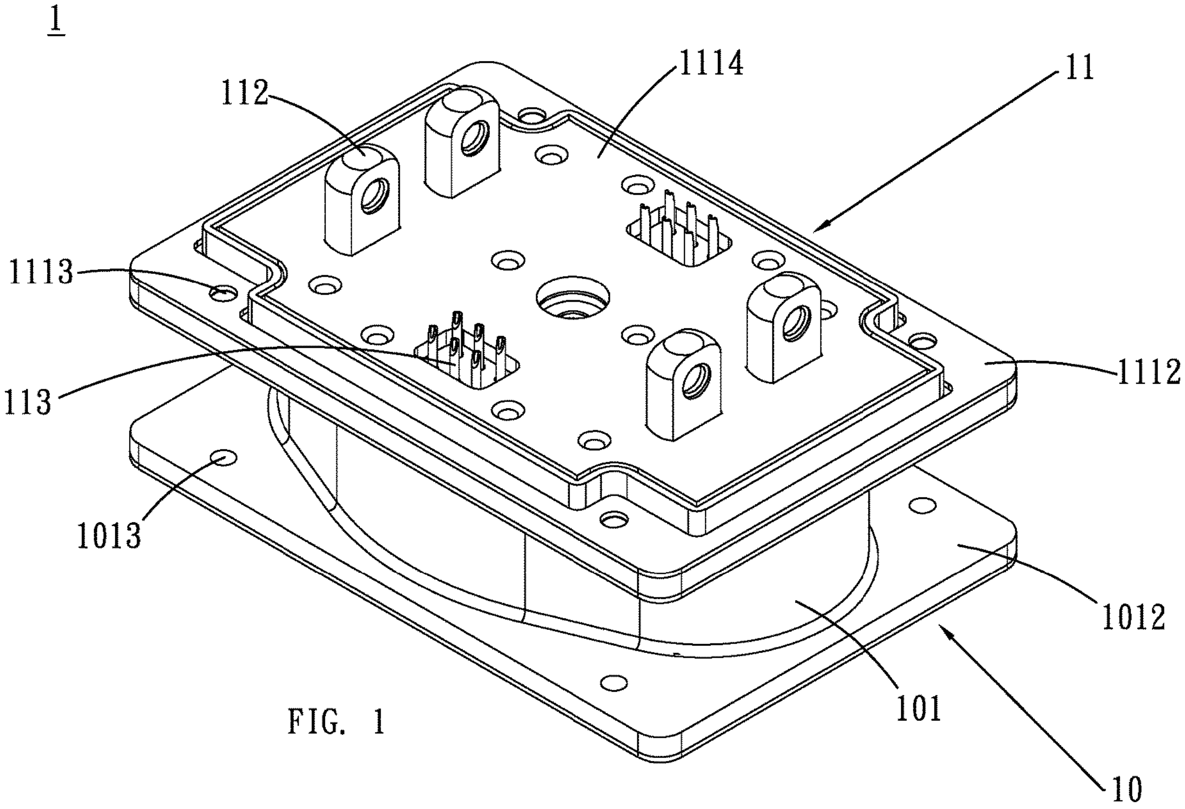
FIG. 1 is a perspective view showing the assembly of a connection module according to a first embodiment of the present invention.
Figure 2:
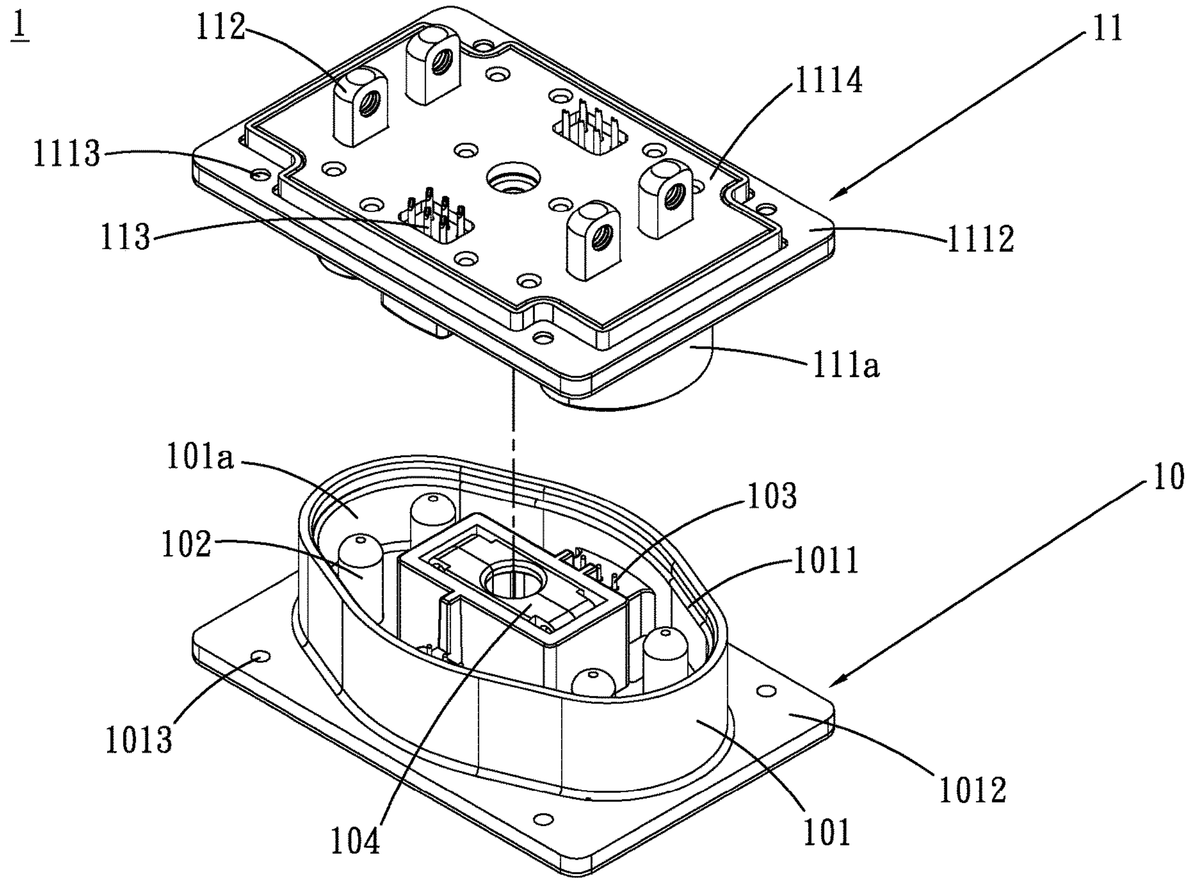
FIG. 2 is a perspective view showing the exploded components of the connection module according to the first embodiment of the present invention.
Figure 3:
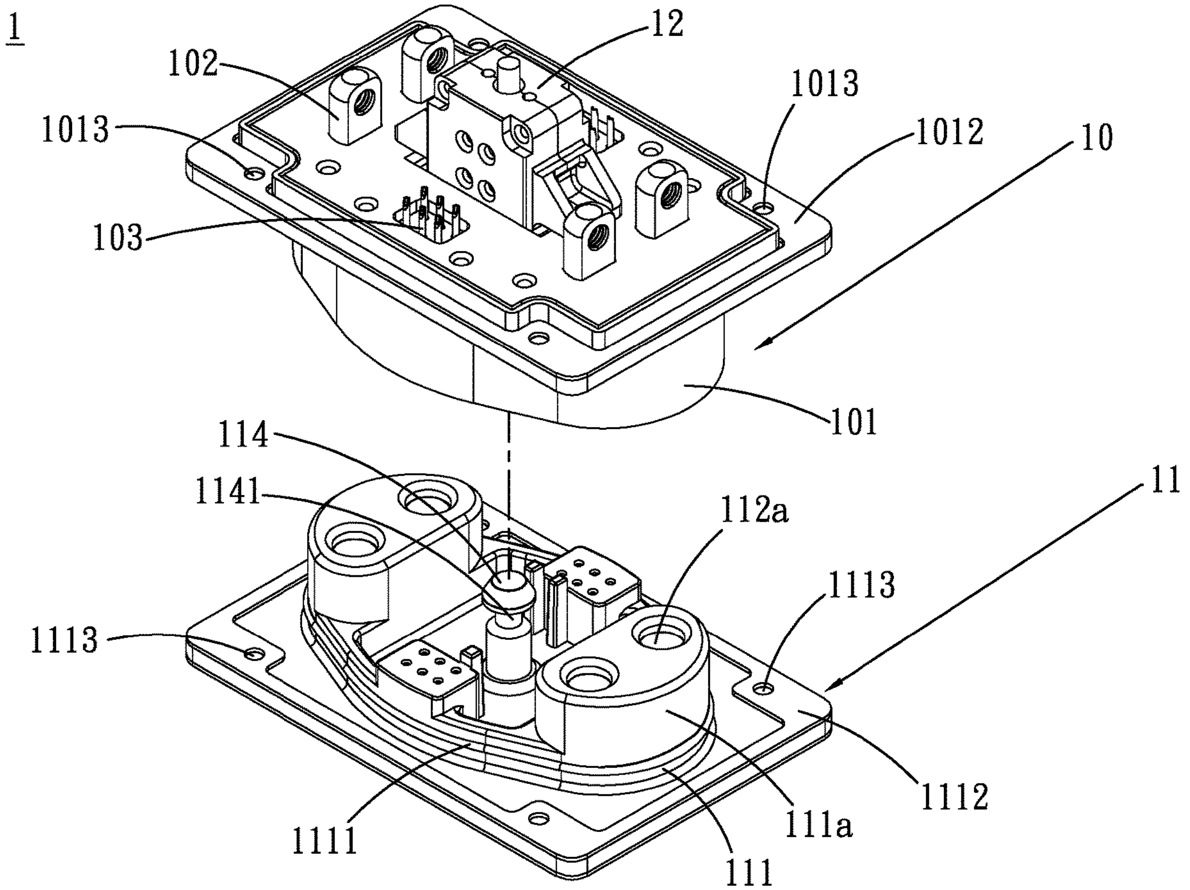
FIG. 3 is another perspective view showing the exploded components of the connection module according to the first embodiment of the present invention.
Figure 4:
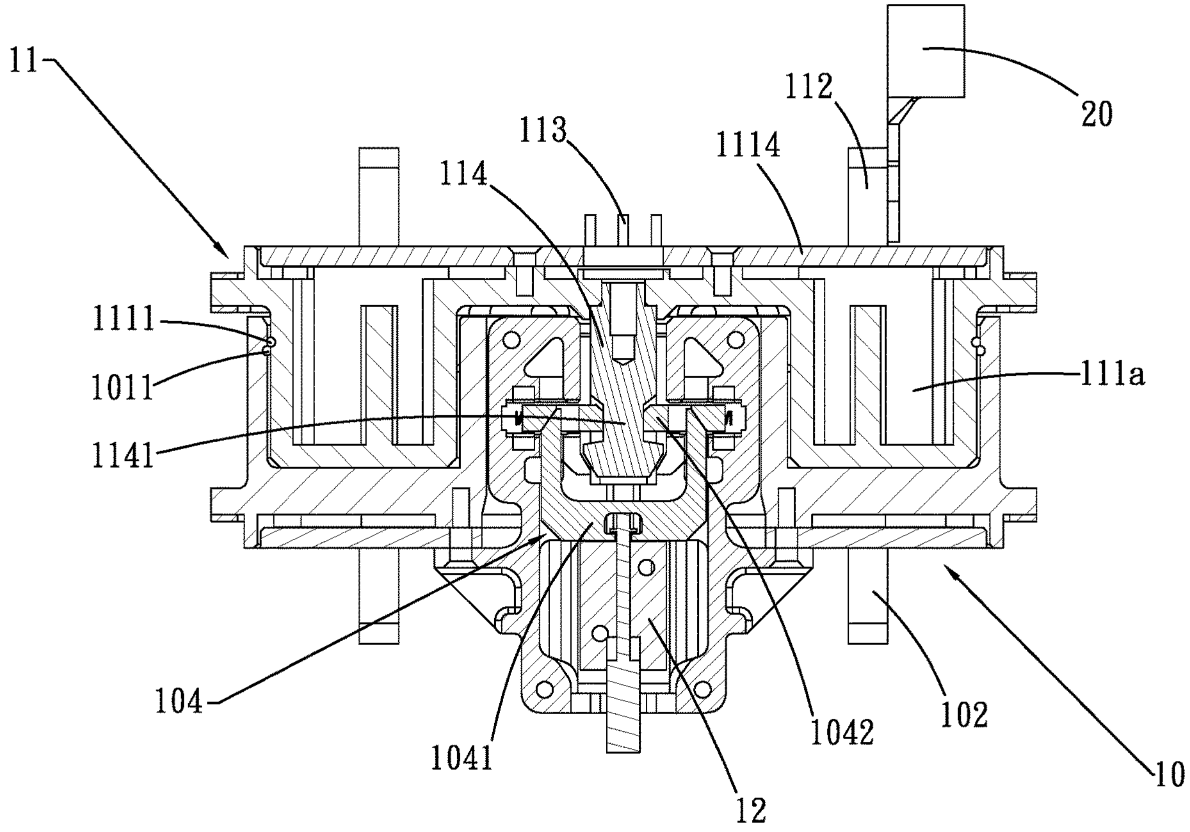
FIG. 4 is a cross sectional view showing the assembly of the connection module according to the first embodiment of the present invention.
Figure 5:
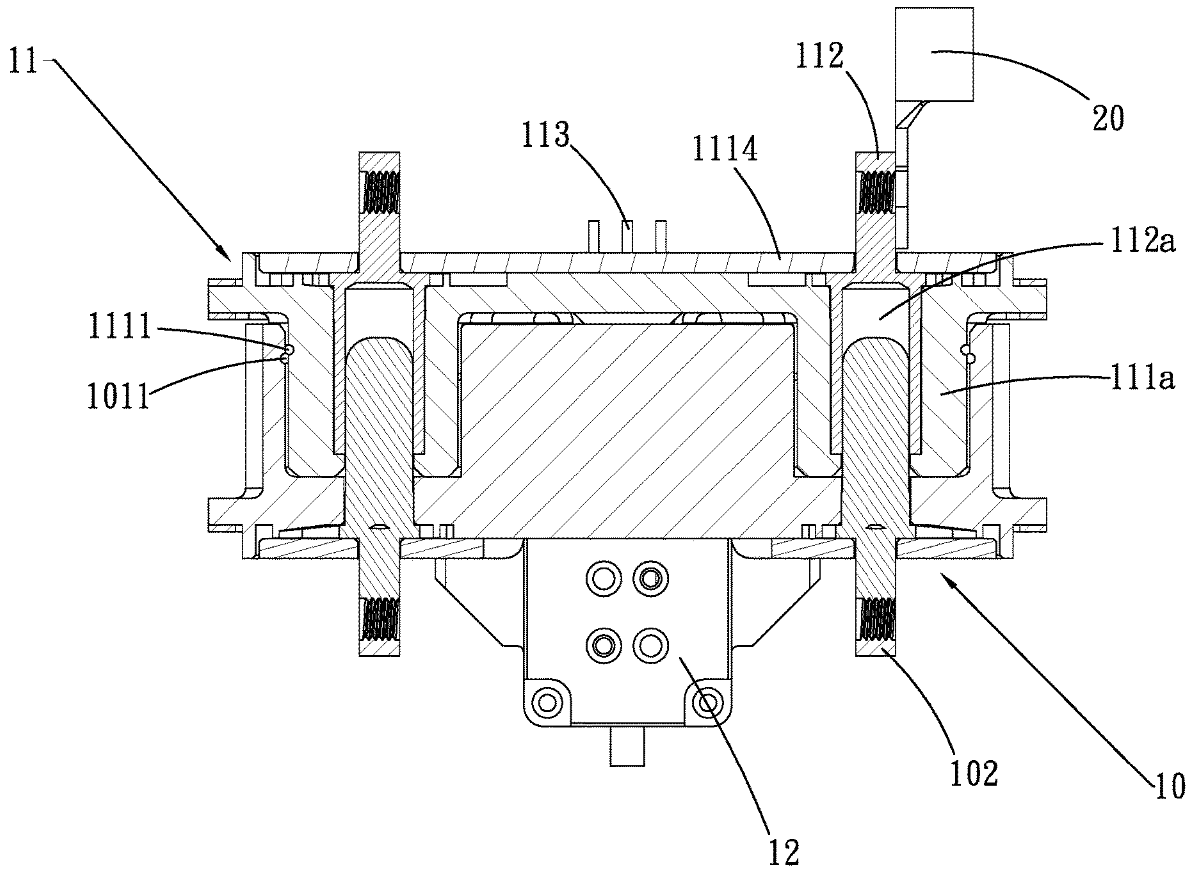
FIG. 5 is another cross sectional view showing the assembly of the connection module according to the first embodiment of the present invention.
Figure 6:
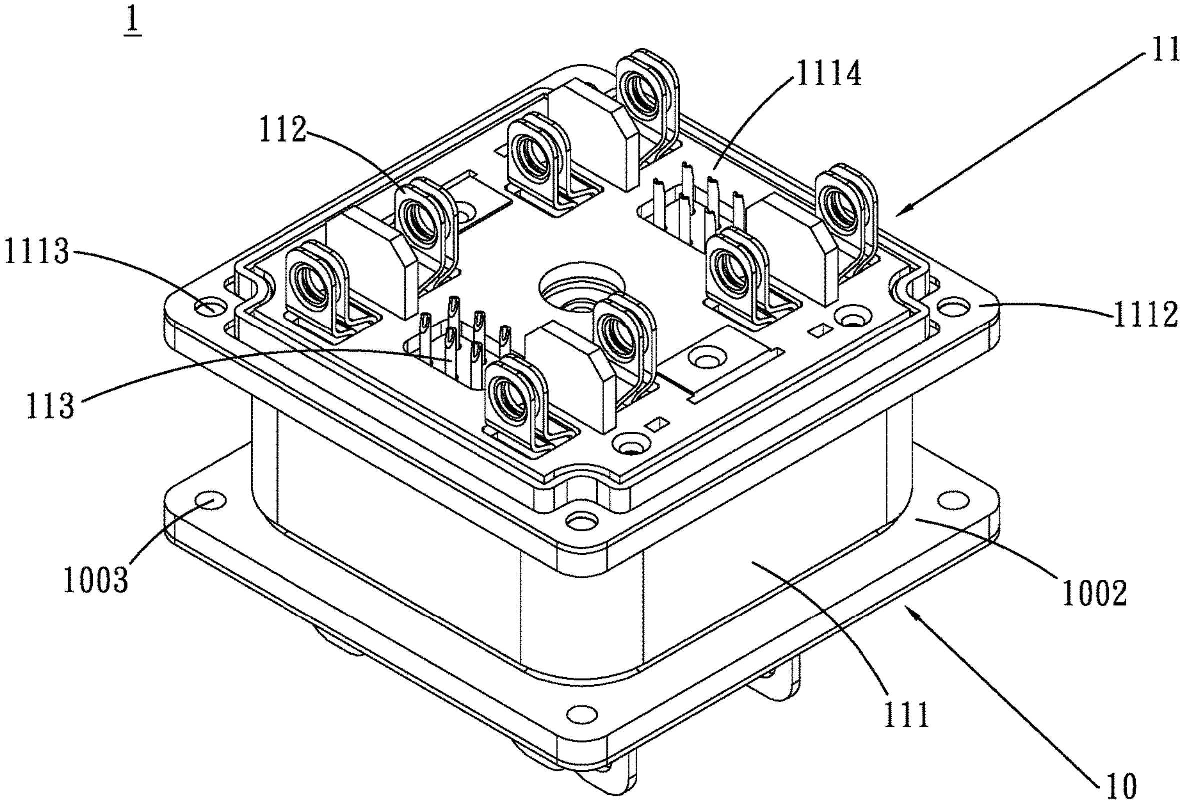
FIG. 6 is a perspective view showing the assembly of a connection module according to a second embodiment of the present invention.
Figure 7:
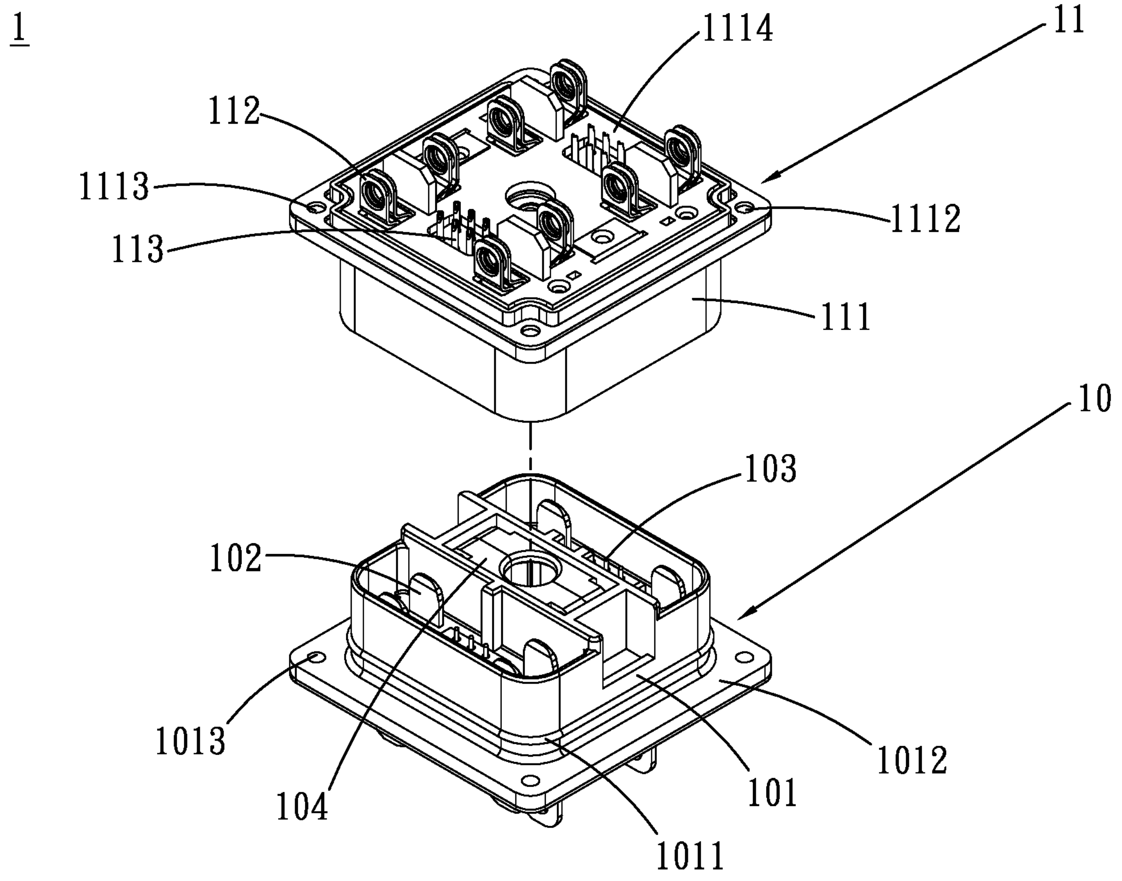
FIG. 7 is a perspective view showing the exploded components of the connection module according to the second embodiment of the present invention.
Figure 8:
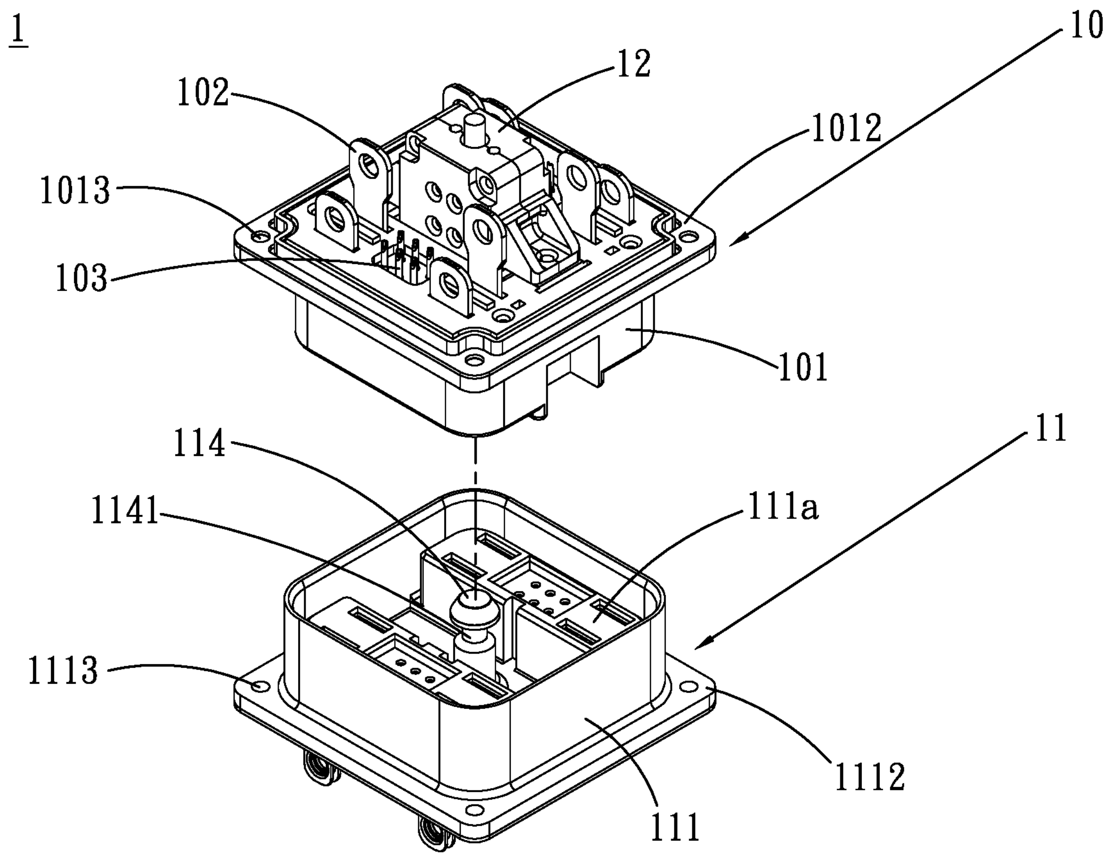
FIG. 8 is a perspective view showing the exploded components of the connection module according to the second embodiment of the present invention.
Figure 9:
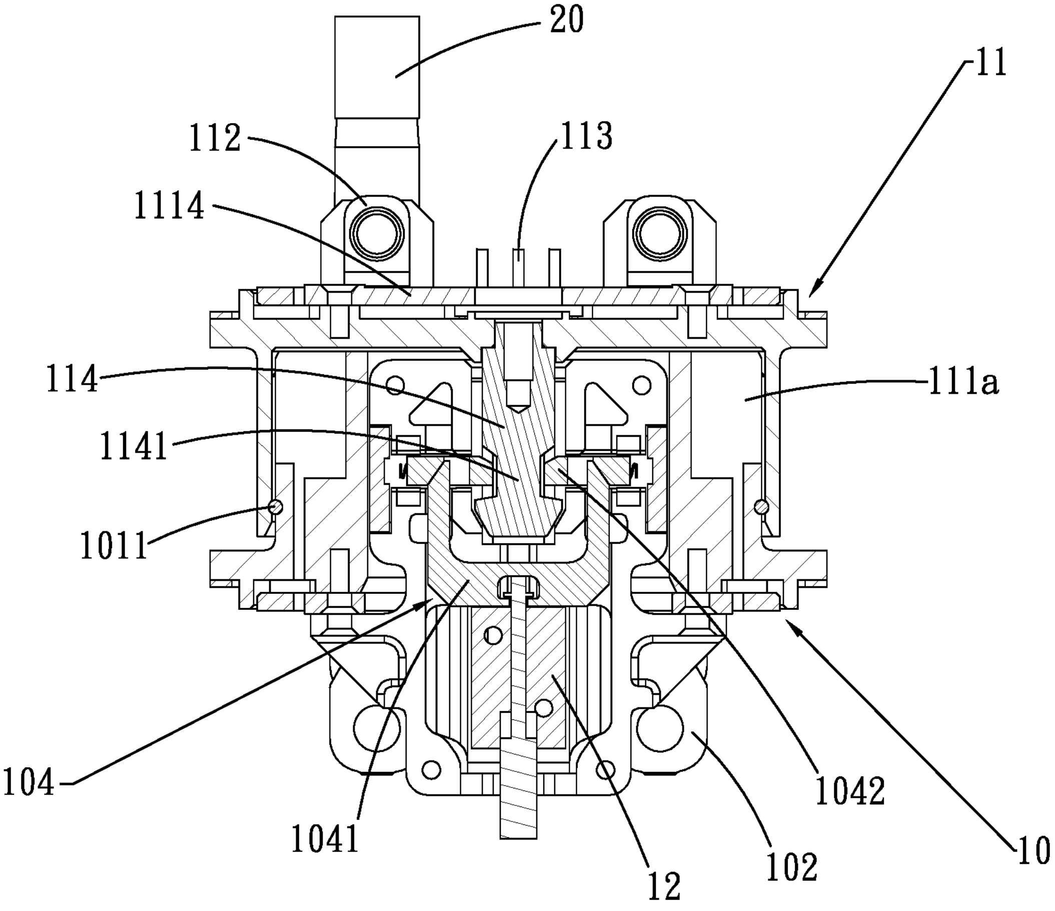
FIG. 9 is a cross sectional view showing the assembly of the connection module according to the second embodiment of the present invention.

With reference to FIGS. 1-9, a connection module 1 capable of integrating electronic control according to a preferred embodiment of the present invention comprises:

a male connection assembly 10 including a coupling section 101, at least one current transmission set 102, at least one signal transmission set 103 and at least one engagement portion 104 which are received in the coupling section 101 of the male connection assembly 12, wherein the at least one engagement portion 104 has a drive mechanism 1041 arranged on a predetermined position thereof and configured to actuate the at least one engagement portion 104;

a female connection assembly 11 including a coupling section 111, at least one current transmission set 112, at least one signal transmission set 113 and at least one engagement portion 114 which are arranged on the coupling section 111 of the female connection assembly 11;

a controlling portion 12 accommodated in the male connection assembly 10 and connected with the drive mechanism 1041 of the male connection assembly 10 to actuate, control and detect the drive mechanism 1041;

wherein the male connection assembly 10 is located below the female connection assembly 11 so that the male connection assembly 10 mates with the female connection assembly 11, the coupling section 111 of the female connection assembly 11 is covered in the coupling section 101 of the male connection assembly 10 so that the current transmission set 102 of the male connection assembly 10 contacts with the current transmission set 112 of the female connection assembly 11, the signal transmission set 103 of the male connection assembly 10 contacts with the signal transmission set 113 of the female connection assembly 11, and the engagement portion 114 of the female connection assembly 11 is received in and connected with the engagement portion 104 of the male connection assembly 10.

The coupling section 101 of the male connection assembly and the coupling section 111 of the female connection assembly 11 are formed in any one of a circle shape, an oval shape, and a square shape having four arcuate corners.

The coupling section 101 of the male connection assembly has a fixing portion 1012 extending from a bottom thereof, and the fixing portion 1012 has multiple locating orifices 1013 defined thereon. The coupling section 111 of the female connection assembly 11 has a fixing portion 1112 extending from a bottom thereof, the fixing portion 1112 has multiple locating orifices 1113 defined thereon, and the fixing portion 1112 of the female connection assembly 11 has a lid 1114 extending from a top thereof.

The fixing portion 1012 of the male connection assembly and the fixing portion 1112 of the female connection assembly 11 are formed in a square shape to mate with a three-dimensional or a horizontal interface of a device.

In another embodiment, the fixing portion 1012 of the male connection assembly 10 and the fixing portion 1112 of the female connection assembly 11 are formed in a circle shape or an oval shape to mate with a circular interface or an oval interface of a device.

The engagement portion 104 of the male connection assembly 10 has two symmetrical retaining extensions 1042 extending from a top thereof, and the coupling section 111 of the female connection assembly 11 has a protection extension **111*a* extending therefrom and configured to cover the fixing portion 1112 of the female connection assembly 11, wherein the protection extension 111*a* has a predetermined length and a predetermined width and is connected with the current transmission set 112 of the female connection assembly 11, wherein the predetermined length of the protection extension 111*a* is more than the coupling section 111 of the female connection assembly 11, the at least one engagement portion 114 of the female connection assembly 11 is a pin, and the pin of the female connection assembly 11 has a clamp portion 1141, wherein a diameter of the clamp portion 1141 is less than a diameter of the pin of the female connection assembly 11, and the controlling portion 12** is an electromagnetic valve.

In operation of the first embodiment, the coupling section 111 of the female connection assembly 11 is inserted into the coupling section 101 of the male connection assembly 12, wherein the coupling section 101 of the male connection assembly 12 has a body **101*a* in which an accommodation chamber is defined, and the body 101*a* has a waterproof ring 1011 surrounding the body 101*a*, wherein a diameter of the coupling section 111 of the female connection assembly 11 is less than a diameter of the accommodation chamber of the body 101*a*. The coupling section 111 of the female connection assembly 11 has a waterproof ring 1111 surrounding therearound, wherein the current transmission set 112 of the female connection assembly 11 is a terminal of a crown spring connector, and the current transmission set 112 has a recess 112*a* defined thereon, wherein 1) the current transmission set 102 of the male connection assembly 10 is inserted into and contacts with the recess 112*a* of the current transmission set 112 of the female connection assembly 11, and the protection extension 111*a* covers the current transmission set 102 of the male connection assembly 10 and the current transmission set 112 of the female connection assembly 11; the signal transmission set 103 of the male connection assembly 10 contacts with the signal transmission set 113 of the female connection assembly 11, and the engagement portion 114 of the female connection assembly 11 is received in and is connected with the engagement portion 104 of the male connection assembly 10**.

2) the two symmetrical retaining extensions 1042 of the engagement portion 104 of the male connection assembly 10 engage with the at least one engagement portion 114 of the female connection assembly 11, and the two symmetrical retaining extensions 1042 of the male connection assembly 10 are the clamp portion 1141 of the at least one engagement portion 104.

3) The controlling portion 12 is operated to control the drive mechanism 1041 of the male connection assembly 10 and to control an engagement force of the two symmetrical retaining extensions 1042 of the drive mechanism 1041.

In operation of the second embodiment, the coupling section 111 of the female connection assembly 11 is covered to the coupling section 101 of the male connection assembly 12, wherein the coupling section 101 has a predetermined height and the waterproof ring 1011 of the coupling section 101, wherein a diameter of the coupling section 111 of the female connection assembly 11 is more than a diameter of the coupling section 101, and wherein 1) the current transmission set 102 of the male connection assembly 10 contacts with the current transmission set 112 of the female connection assembly 11, the protection extension 111*a* covers the current transmission set 102 of the male connection assembly 10 and the current transmission set 112 of the female connection assembly 11; the signal transmission set 103 of the male connection assembly 10 contacts with the signal transmission set 113 of the female connection assembly 11, and the engagement portion 114 of the female connection assembly 11 is received in and is connected with the engagement portion 104 of the male connection assembly 10;

2) the two symmetrical retaining extensions 1042 of the engagement portion 104 of the male connection assembly 10 engage with the at least one engagement portion 114 of the female connection assembly 11, and the two symmetrical retaining extensions 1042 of the engagement portion 104 of the male connection assembly 10 are the clamp portion 1141 of the engagement portion 104; and 3) the controlling portion 12 is operated to control the drive mechanism 1041 of the male connection assembly 10 and to control an engagement force of the two symmetrical retaining extensions 1042 of the drive mechanism 1041.

It is to be noted that the current transmission set 112 of the female connection assembly 11 has a circular terminal 20 formed on a first end thereof and configured to contact with the current transmission set 112, and a second end of the circular terminal 20 is electrically connected with an electric wire.

Thereby, the current transmission set 102 of the male connection assembly 10 is connected with the current transmission set 112 of the female connection assembly 11 to transmit large electric currents, and the at least one signal transmission set 103 and the at least one signal transmission set 113 transmit signals and small electric currents. The protection extension 111*a* of the female connection assembly 11 protects the current transmission set 102 and the current transmission set 112 to stabilize the electric currents. The waterproof ring 1011 of the coupling section 101 and the waterproof ring 1111 of the coupling section 111 provide waterproof to the connection module 1. The two symmetrical retaining extensions 1042 of the engagement portion 104 engage with the at least one engagement portion 114 of the female connection assembly 11, and the controlling portion 12 is configured to adjust the engagement force of the two symmetrical retaining extensions 1042 of the drive mechanism 1041. In addition, the multiple locating orifices 1013 of the fixing portion 1012 and the multiple locating orifices 1113 of the fixing portion 1112 are configured to receive multiple screws or bolts to connect the connection module 1, and the lid 1114 of the female connection assembly 11 is configured to fix the connection module 1, thus transmitting the large electric currents and the signals. Preferably, the controlling portion 12 is configured to adjust and control the connection module stably.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. A connection module capable of integrating electronic control comprising:

a male connection assembly including a coupling section, at least one current transmission set, at least one signal transmission set and at least one engagement portion which are received in the coupling section of the male connection assembly, wherein the at least one engagement portion has a drive mechanism arranged on a predetermined position thereof and configured to actuate the at least one engagement portion;

a female connection assembly including a coupling section, at least one current transmission set, at least one signal transmission set and at least one engagement portion which are arranged on the coupling section of the female connection assembly;

a controlling portion accommodated in the male connection assembly and connected with the drive mechanism of the male connection assembly to actuate, control and detect the drive mechanism;

wherein the male connection assembly is located below the female connection assembly so that the male connection assembly mates with the female connection assembly, the coupling section of the female connection assembly is covered in the coupling section of the male connection assembly so that the current transmission set of the male connection assembly contacts with the current transmission set of the female connection assembly; the signal transmission set of the male connection assembly contacts with the signal transmission set of the female connection assembly; and the engagement portion of the female connection assembly is received in and connected with the engagement portion of the male connection assembly;

wherein the engagement portion of the male connection assembly has two symmetrical retaining extensions extending from a top thereof to engage and reinforce the connection module;

wherein the current transmission set of the female connection assembly is a terminal of a crown spring connector, and the current transmission set has a recess defined thereon and configured to connect with the current transmission set of the male connection assembly;

wherein the controlling portion is an electromagnetic valve, and the controlling portion is configured to adjust an engagement force of the two symmetrical retaining extensions of the drive mechanism.

2. The connection module as claimed in claim 1, wherein the coupling section of the male connection assembly and the coupling section of the female connection assembly are formed in any one of a circle shape, an oval shape, and a square shape having four arcuate corners;

the coupling section of the male connection assembly has a fixing portion extending from a bottom thereof, and the fixing portion has multiple locating orifices defined thereon; the coupling section of the female connection assembly has a fixing portion extending from a bottom thereof, the fixing portion has multiple locating orifices defined thereon;

the fixing portion of the male connection assembly and the fixing portion of the female connection assembly are formed in a square shape to mate with a three-dimensional or a horizontal interface of a device;

the fixing portion of the male connection assembly and the fixing portion of the female connection assembly are alternatively formed in a circle shape or an oval shape to mate with a circular interface or an oval interface of a device.

3. The connection module as claimed in claim 1, wherein the coupling section of the female connection assembly is inserted into the coupling section of the male connection assembly, wherein the coupling section of the male connection assembly has a body in which an accommodation chamber is defined, and the body has a waterproof ring surrounding the body, wherein a diameter of the coupling section of the female connection assembly is less than a diameter of the accommodation chamber of the body, and the coupling section of the female connection assembly has a waterproof ring surrounding therearound;

wherein the coupling section of the female connection assembly is covered to the coupling section of the male connection assembly, wherein the coupling section of the male connection assembly has a predetermined height and the waterproof ring of the coupling section of the male connection assembly, wherein a diameter of the coupling section of the female connection assembly is more than a diameter of the coupling section of the male connection assembly.

4. The connection module as claimed in claim 1, wherein the coupling section of the female connection assembly has a protection extension extending therefrom and configured to cover the fixing portion of the female connection assembly, wherein the protection extension has a predetermined length and a predetermined width, and the predetermined length of the protection extension is more than the coupling section of the female connection assembly.

5. The connection module as claimed in claim 1, wherein the fixing portion of the female connection assembly has a lid extending from a top thereof.

6. The connection module as claimed in claim 1, wherein the current transmission set of the female connection assembly has a circular terminal formed on a first end thereof and configured to contact with the current transmission set of the male connection assembly, and a second end of the circular terminal is electrically connected with an electric wire.

7. The connection module as claimed in claim 1, wherein the at least one engagement portion of the female connection assembly is a pin, and the pin of the female connection assembly has a clamp portion.

* * * * *